United States Patent
Magoteaux et al.

[11] Patent Number: 5,947,512
[45] Date of Patent: Sep. 7, 1999

[54] TETHERED HORN SWITCH FOR AIR BAG MODULE

[75] Inventors: David G. Magoteaux, Mesa; Frank P. Leonelli, Jr., Gilbert, both of Ariz.; Gregory D. Rizzo, Washington, Mich.

[73] Assignees: TRW Inc.; TRW Vehicle Safety Systems Inc., both of Lyndhurst, Ohio

[21] Appl. No.: 08/954,014

[22] Filed: Oct. 20, 1997

[51] Int. Cl.⁶ .................................................. B60R 21/22
[52] U.S. Cl. .................. 280/731; 200/61.54; 200/6.155; 280/728.3
[58] Field of Search ................................ 280/731, 728.3, 280/728.1; 200/61.54, 61.55

[56] References Cited

U.S. PATENT DOCUMENTS

| | | | |
|---|---|---|---|
| 4,612,425 | 9/1986 | Kanai et al. | 200/61.55 |
| 4,714,806 | 12/1987 | Inui et al. | 200/61.55 |
| 5,399,819 | 3/1995 | Lang et al. | 200/61.54 |
| 5,639,114 | 6/1997 | Margetak et al. | 280/728.3 |
| 5,727,812 | 3/1998 | Dykstra et al. | 280/731 |

OTHER PUBLICATIONS

U.S. Patent Appln. Serial No. 08/810,580, filed Mar. 4, 1997, entitled "Horn Switch for Air Bag Module".
U.S. Patent Appln. Serial No. 08/811,335, filed Mar. 4, 1997, entitled "Horn Switch for Air Bag Module".

*Primary Examiner*—Eric Culbreth
*Attorney, Agent, or Firm*—Tarolli, Sundheim, Covell, Tummino & Szabo

[57] ABSTRACT

An apparatus (10) for covering an inflatable vehicle occupant protection device (40) includes a cover (70) including a portion (82) movable upon inflation of the inflatable device from a closed condition to an open condition. A retainer (50) supports the inflatable device (40) on a portion of the vehicle. A membrane switch (100) in an electric circuit for actuating an electrically actuatable device (102) of the vehicle is movable with the movable portion (82) of the cover (70) from the closed condition to the open condition. The cover (70) has a portion engageable by the vehicle occupant to operate the membrane switch (100) and thereby to actuate the electrically actuatable device (102). The apparatus (10) includes a rigid back plate (110) for the membrane switch (100), and fasteners (90, 120) for connecting the back plate with the movable portion of the cover (70). A flexible tether (130) connects the back plate (110) with the retainer (50) resist movement of the back plate away from the retainer beyond a predetermined amount.

15 Claims, 3 Drawing Sheets

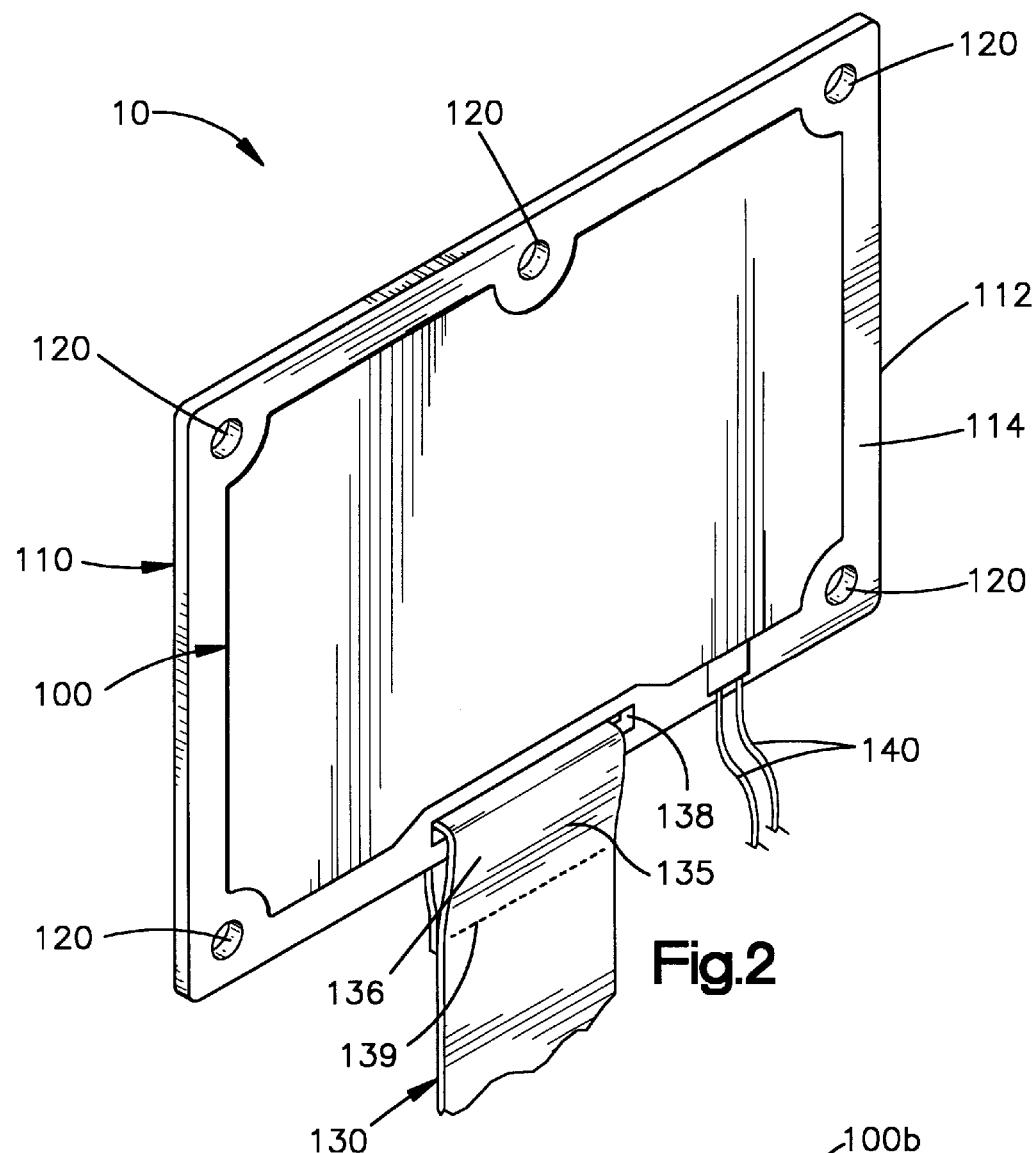
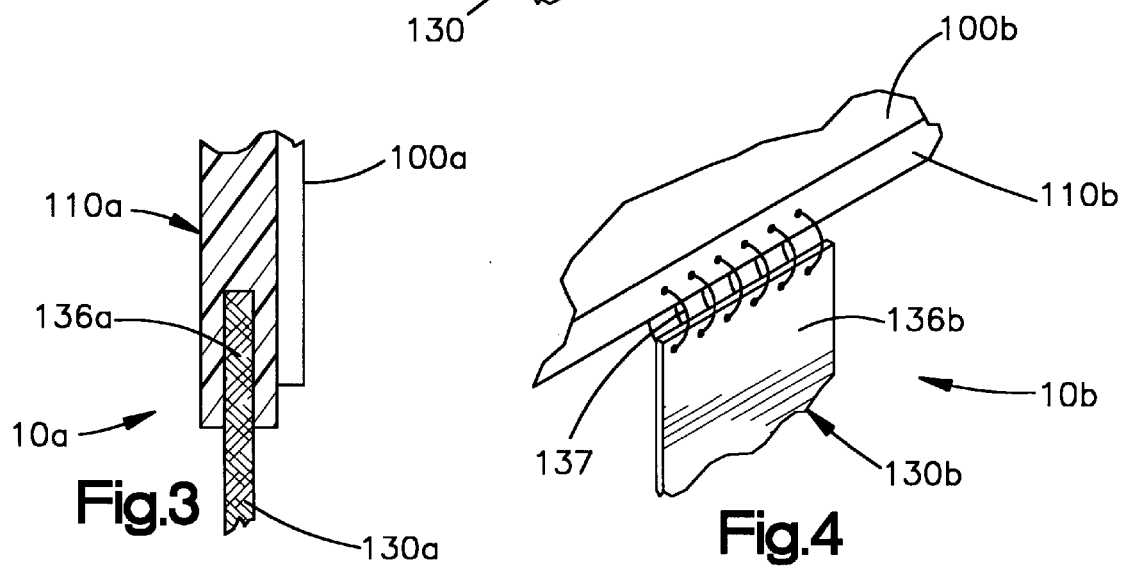

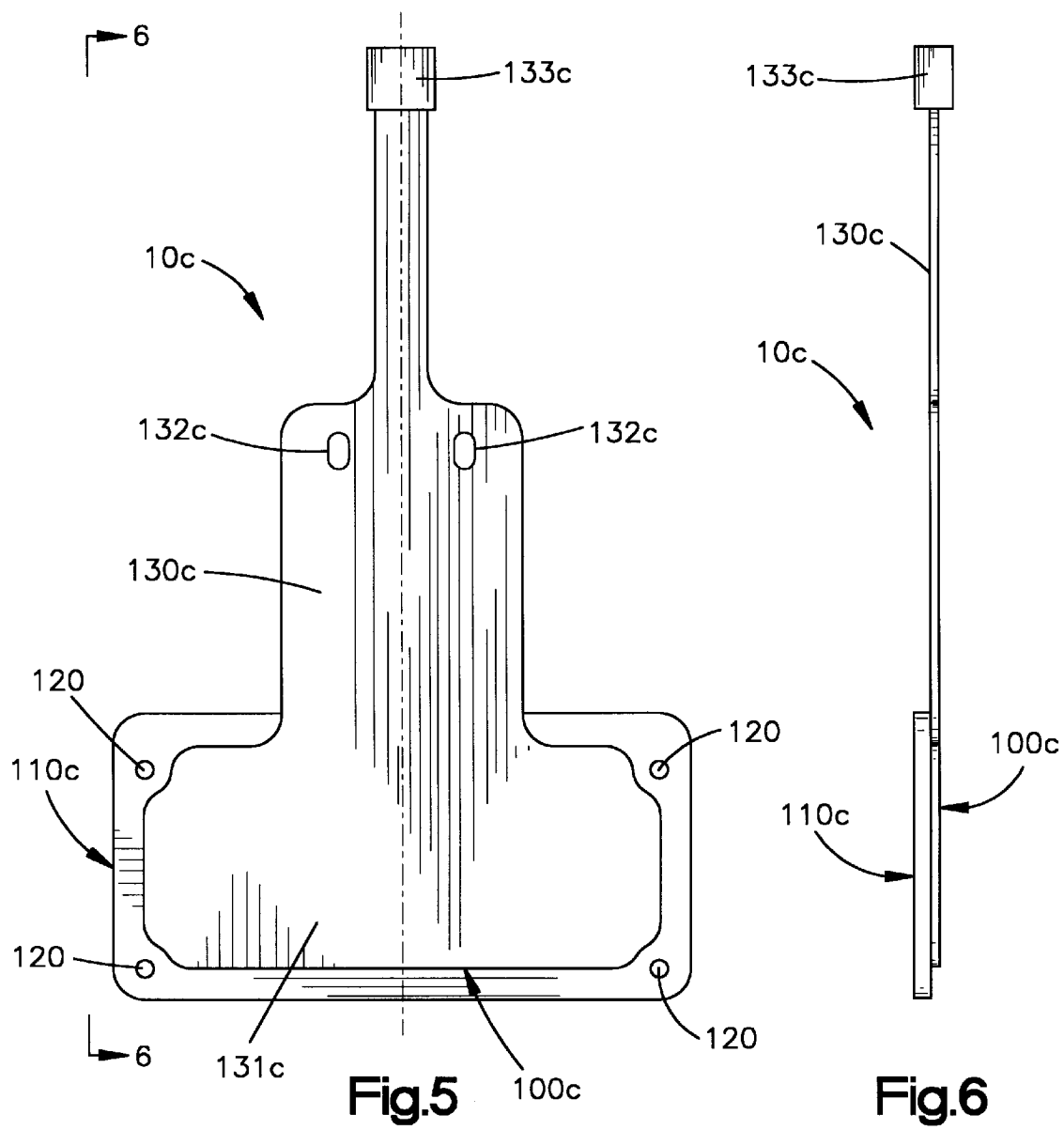

TETHERED HORN SWITCH FOR AIR BAG MODULE

BACKGROUND OF THE INVENTION

1. Technical Field

The present invention relates to a switch for mounting on a portion of a vehicle as part of a vehicle safety apparatus. In particular, the present invention relates to a horn switch that is part of an air bag module mounted on a vehicle steering wheel.

2. Description of the Prior Art

It is known to mount an air bag module on a steering wheel of a vehicle to help protect the driver of the vehicle. The air bag module includes an air bag and an inflator. In the event of sudden vehicle deceleration of a magnitude which requires protection of the driver, the inflator is actuated to inflate the air bag into a position to help protect the driver of the vehicle.

It is known to provide a horn switch that is operable by pressing on a cover of an air bag module mounted on a vehicle steering wheel. The horn switch may be, for example, a membrane type horn switch which is connected to the inside of a movable part of the air bag module cover. The inflating air bag moves the movable cover part from a closed condition to an open condition to enable inflation of the air bag out of the cover. The horn switch moves with the movable cover part upon inflation of the air bag. Because the movable cover part opens forcefully and rapidly upon inflation of the air bag, the horn switch must be securely fastened to the module.

SUMMARY OF THE INVENTION

The present invention is an apparatus for covering an inflatable vehicle occupant protection device. The apparatus comprises a cover including a portion movable from a closed condition to an open condition upon inflation of the inflatable device. Support means supports the inflatable device on a portion of the vehicle. A membrane switch in an electric circuit for actuating an electrically actuatable device of the vehicle is movable with the movable portion of the cover from the closed condition to the open condition. The cover has a portion engageable by the vehicle occupant to operate the membrane switch and thereby to actuate the electrically actuatable device. The apparatus includes a rigid back plate for the membrane switch and means for connecting the back plate with the movable portion of the cover. A flexible tether connects the back plate with the inflatable device to resist movement of the back plate away from the support means beyond a predetermined amount.

BRIEF DESCRIPTION OF THE DRAWING

The foregoing and other features of the present invention will become apparent to one skilled in the art to which the present invention relates upon consideration of the following description of the invention with reference to the accompanying drawings, wherein:

FIG. 2 is a perspective view of the horn switch and tether of FIG. 1;

FIG. 3 is a partial sectional view illustrating a tether for a horn switch in accordance with a second embodiment of the present invention;

FIG. 4 is a partial perspective view illustrating a tether for a horn switch in accordance with a third embodiment of the present invention;

FIG. 5 is an elevational view illustrating a tether for a horn switch in accordance with a fourth embodiment of the present invention; and FIG. 6 is a view taken generally along line 6—6 of FIG. 5.

DESCRIPTION OF THE PREFERRED EMBODIMENT

Figure 1:
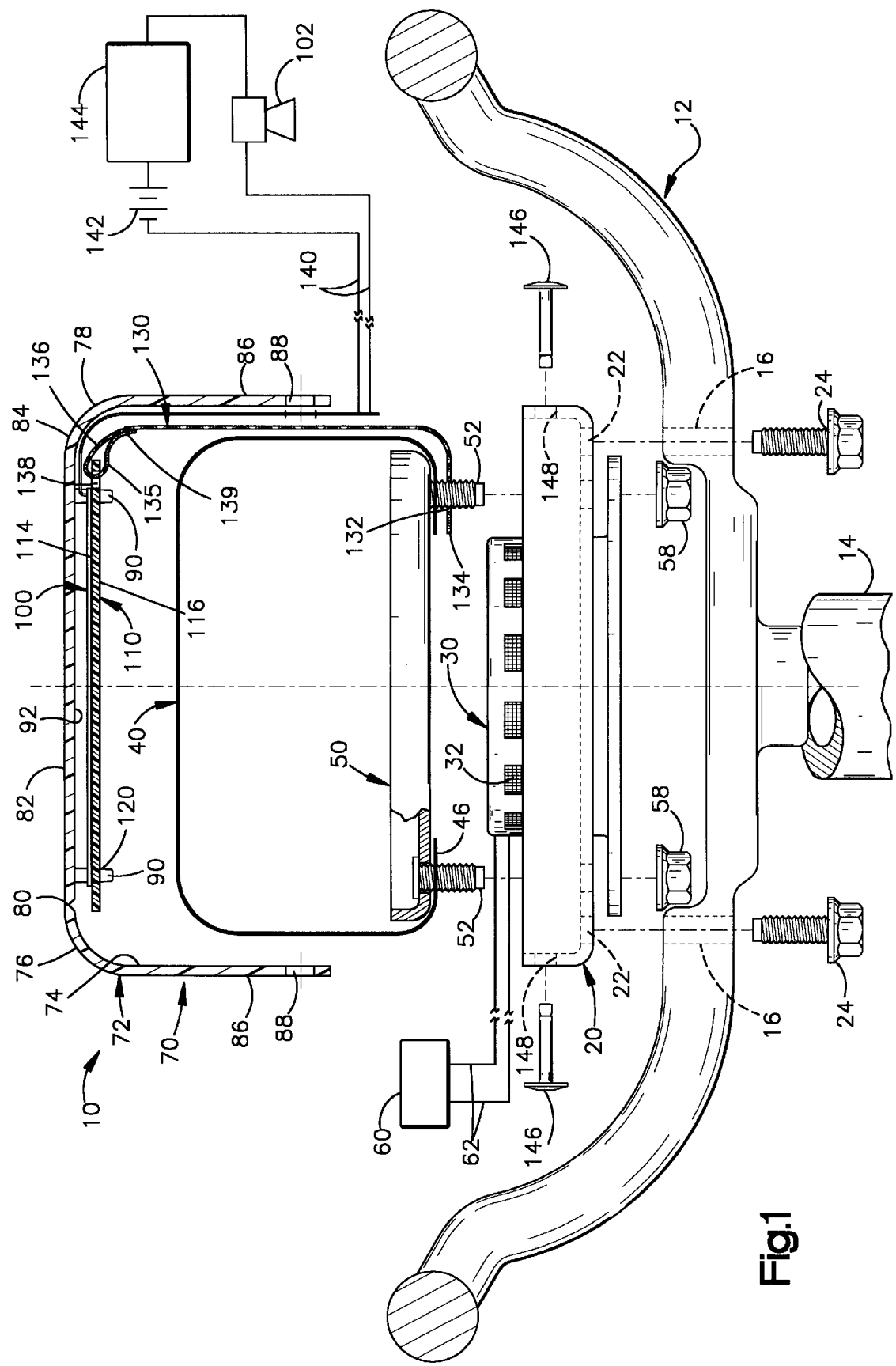
FIG. 1 is a schematic view, partially in section, showing a horn switch as part of an air bag module mounted on a vehicle steering wheel and including a tether connected with the horn switch.

The present invention relates to a vehicle safety apparatus including a switch. In particular, the present invention relates to an air bag module which includes a switch for an electrically actuatable device of the vehicle, such as a vehicle horn. As representative of the present invention, FIG. 1 illustrates an air bag module 10.

The air bag module 10 is mounted on a vehicle steering wheel, a portion of which is shown at 12. The steering wheel 12 is supported on a steering shaft or steering column of the vehicle indicated schematically at 14. A plurality of fastener openings 16 are formed in the steering wheel 12.

The air bag module 10 includes a support or base plate 20 which is preferably made from steel or aluminum. A plurality of fastener openings 22 are spaced apart around the periphery of the base plate 20. A plurality of bolts 24 extend through the fastener openings 16 in the steering wheel 12 and are screwed into the fastener openings 22 in the base plate 20. The bolts 24 secure the base plate 20 to the steering wheel 12.

The air bag module 10 includes an inflator 30 which is supported in a known manner (not shown) on the base plate 20. The inflator 30 has one or more fluid outlets 32 for directing inflation fluid into an air bag 40 upon actuation of the inflator. The inflator 30 is illustrated as a pyrotechnic inflator which uses the combustion of gas-generating material to generate inflation fluid in the form of gas to inflate the air bag 40. The module 10 alternatively could include an inflator which contains a stored quantity of pressurized inflation fluid, or a combination of pressurized inflation fluid and ignitable material for heating the inflation fluid.

The air bag 40 is illustrated schematically in a deflated, packed condition in FIG. 1. The air bag 40 is preferably made from a fabric material such as woven nylon. The air bag 40 can alternatively be made from non-woven material, such as plastic film. The use of plastic film, in particular, would require inflation fluid vents to be formed in the air bag 40, as is known in the art.

The module 10 includes a retaining ring 50 from which extend a plurality of fasteners 52, such as weld studs. The fasteners 52 on the retaining ring 50 extend through openings in an end portion 46 of the air bag 40. The retaining ring 50 is secured to the base plate 20 by nuts 58 screwed onto the fasteners 52. The end portion 46 of the air bag 40 is clamped between the retaining ring 50 and the base plate 20. As a result, the air bag 40 is secured in position on the vehicle steering wheel 12, adjacent to the inflator 30.

The vehicle includes known means 60 for sensing a collision involving the vehicle and for actuating the inflator 30 in response to the sensing of a collision. The means 60 may include a deceleration sensor and vehicle electric circuitry for actuating the inflator 30 in response to sensing a vehicle deceleration indicative of a vehicle collision having a severity greater than a predetermined threshold value. As discussed below, the means 60 provides an electric signal over lead wires 62 to the inflator 30, when the inflator is to be actuated.

The air bag module 10 includes a cover 70 for enclosing the air bag 40 and the inflator 30. The cover 70 is made from a material which is strong enough to protect the parts of the air bag module 10 which are enclosed within the cover. The material of the cover 70 is sufficiently flexible or deformable so that it can be resiliently deformed inwardly (that is, in a downward direction as viewed in FIG. 1) by pressure from an occupant of the vehicle, so as to actuate an electrical device of the vehicle such as the vehicle horn.

The cover 70 has a main body portion 72 which has inner and outer side surfaces 74 and 76. The main body portion 72 of the cover 70 includes a fixed part 78 of the cover. A tear seam 80 is formed in the cover 70 to enable inflation of the air bag 40 out of the cover. The tear seam defines a movable part 82 of the cover 70. The movable part 82 of the cover 70 is pivotable relative to the fixed part 78, about a hinge portion 84 of the cover, in a clockwise direction as viewed in FIG. 1, upon inflation of the air bag 40 and rupturing of the tear seam 80.

A mounting flange or mounting portion 86 of the cover 70 extends from the main body portion 72 in a direction toward the base plate 20. A plurality of fastener openings 88 are formed in the mounting portion 86 of the cover 70.

A plurality of identical fasteners are formed on the cover 70, in the form of pins 90. The pins 90 project inward toward the air bag 40 from the inner side surface 92 of the movable cover part 82. The pins 90 are spaced apart in an array on the inside of the movable cover part 82. In the illustrated embodiment, five of the pins 90 are provided; the number of pins can be different for a module of a different design or configuration.

The air bag module 10 includes a switch assembly or switch 100 for actuating an electrically actuatable device of the vehicle, such as a vehicle horn indicated schematically at 102 (FIG. 1). In the preferred embodiment, the switch 100 is a known membrane type switch which includes first and second layers of flexible substrate material, on which layers of electrically conductive material are deposited. The layers of electrically conductive material are engageable with each other, in response to the application of force to the switch 100, to change the resistance of the switch.

The switch 100 is mounted with a rigid, generally planar backer plate or back plate 110 at a position underlying the movable cover part 82. The back plate 110 has a main body portion 112 (FIG. 2) with opposite major side surfaces 114 and 116 (FIG. 1). The switch 100 as illustrated is adhered to the major side surface 114 of the back plate 110, but need not be adhered to the back plate. The back plate 110 is made from a material which is more rigid than the material of the cover 70. The back plate 110 provides a rigid support for the switch 100, so that force applied to the cover 70 can result in operation of the switch.

A plurality of retention features 120 in the back plate 110 extend between the major side surfaces 114 and 116 of the back plate. In the illustrated embodiment, the retention features 120 are fastener openings spaced apart around the outer periphery of the back plate 110. The switch 100 is positioned between the cover 70 and the back plate 110. The pins 90 on the cover 70 extend through the fastener openings 120 in the back plate 110 and are connected with the back plate in a suitable manner, such as by an interference fit or press fit in the retention features or by heat staking.

The back plate 110 is spaced apart from the base plate 20 in a direction generally perpendicular to the plane of the back plate. The back plate 110, because it is a rigid, planar member, thus can not be attached directly to the base plate 20.

The air bag module 10 includes a flexible tether 130 for helping to resist movement of the back plate 110, and thus the horn switch 100, away from the base plate 20. In the illustrated embodiment, the tether 130 is made from an elongate strap of fabric material, such as woven nylon of the type from which the air bag 40 is constructed. One or more first fastener openings 132 is formed in a first end portion 134 of the tether 130. An opposite second end portion 136 of the tether is formed into a loop 135 and extends through a slot 138 in the back plate 110. The loop 135 is sewn to itself at 139 to connect the second end portion 136 of the tether 130 with the back plate 110. The tether loop 135 may also extend through an opening (not shown) in the horn switch 100, if desired, for retention of the switch.

Rivets 146 extend through the fastener openings 88 in the mounting portion 86 of the cover 70 and through fastener openings 148 in the base plate 20. The mounting portion 86 of the cover 70 is thereby clamped to the base plate 20. The cover 70 can be constructed so as to be secured to the base plate in an alternative manner, such as by snapping on or with a living hinge.

The fasteners 52 on the retaining ring 50 extend through the first fastener openings 132 in the first end portion 134 of the tether 130. The first end portion 134 of the tether 130 is thereby secured to the retaining ring 50. The first end portion 134 of the tether 130 may, alternatively, be secured to the base plate 20 by the rivets 146.

A pair of lead wires 140 or other known types of electrical conductors extend from the switch 100. The lead wires 140 connect the switch 100 with the vehicle horn 102, with a power source 142 such as the vehicle battery, and with vehicle electric circuitry indicated schematically at 144.

To effect operation of the vehicle horn 102, the driver of the vehicle presses on the cover 70 of the air bag module 10 in a downward direction as viewed in FIG. 1. The force applied to the cover 70 of the air bag module 10 is transmitted through the cover to the switch 100. The switch 100, supported by the back plate 110, is operated, and the vehicle horn 102 is energized. When the force on the cover 70 of the air bag module 10 is released, the resilience of the cover causes it to move away from the air bag 40. As this movement occurs, the switch 100 returns to its original condition and the vehicle horn 102 is de-energized.

In the event of an impact to the vehicle of a magnitude greater than the predetermined threshold value, the sensing means 60 provides an electrical signal over the wires 62 to the inflator 30. The inflator 30 is actuated in a known manner. Inflation fluid flows out of the inflator 30 through the fluid outlets 32 and into the air bag 40. The rapidly flowing inflation fluid causes the air bag 40 to inflate in an upward direction as viewed in FIG. 1.

The force of the inflating air bag 40 is applied toward the inside of the switch 100 and the cover 70. Specifically, the inflating air bag 40 pushes outward against the back plate 110 and against the inner side surface 74 of the cover 70. The cover 70 opens along the tear seam 80, which is the predetermined weakened portion of the cover. The cover 70 opens sufficiently that the air bag 40 inflates into a position to help protect the vehicle occupant. When the cover 70 moves to the open condition, the switch 100 moves with the movable cover part 82.

Because the movable cover part 82 is opened rapidly and forcefully, it is important that the switch 100 and the back plate 110 be retained on the movable cover part 82 when the cover opens. The primary mechanism for retention of the switch 100 on the cover 70 is the engagement of the pins 90 on the cover in the fastener openings 120 in the back plate 110. The tether 130 acts as a secondary retention mechanism. Specifically, if the force of the inflating air bag 40 should cause the back plate 110 to disengage from the cover 70, the tether 130 straightens and extends and blocks movement of the back plate away from the base plate 20 beyond a predetermined amount. The predetermined amount is the length of the tether 130 when extended. Because the tether 130 is flexible, a rigid, generally planar back plate, such as the back plate 110, can be used in the module 10, as is needed for proper actuation of the switch 100. At the same time, a secure connection can be provided across the distance between the back plate and the base plate 20.

The switch 100 can be used to actuate an electrically actuatable device of the vehicle other than the vehicle horn 102. For example, the switch 100 could be used to actuate or control the vehicle radio, speed control, etc. Alternatively, the switch 100 could have a plurality of electrically independent active areas for controlling a plurality of electrically actuatable devices including the vehicle horn 102.

FIG. 3 illustrates a portion of an air bag module 10a in accordance with a second embodiment of the present invention. The air bag module 10a is generally similar to the air bag module 10 (FIGS. 1 and 2) and similar parts are given the same reference numerals with the suffix "a" attached for clarity.

The air bag module 10a includes a tether 130a molded to the back plate 110a of the horn switch 100a. The back plate 110a is made from a plastic material which is suitable for molding with the tether 130a. The second end portion 136a of the tether 130a is insert molded with the back plate 110a of the horn switch 100a.

The insert molding of the second end portion 136a of the tether 130a with the back plate 110a provides a secure connection between the tether and the horn switch 110a. Upon inflation of the air bag (not shown) and opening of the cover (also not shown), the tether 130a prevents the back plate 110a and the horn switch 100a from moving away from the base plate by more than a predetermined amount, i.e., the length of the tether.

FIG. 4 illustrates a portion of an air bag module 10b in accordance with a third embodiment of the present invention. The air bag module 10b is generally similar to the air bag module 10 (FIGS. 1 and 2) and similar parts are given the same reference numerals with the suffix "b" attached for clarity.

The air bag module 10b includes a tether 130b sewn to the back plate 110b of the horn switch 100b. Specifically, the second end portion 136b of the tether 130b is sewn with a series of stitches 137 to the back plate 110b of the horn switch 100b. Upon inflation of the air bag (not shown) and opening of the cover (also not shown), the tether 130b prevents the back plate 110b and the horn switch 100b from moving away from the base plate by more than a predetermined amount, i.e., the length of the tether.

FIGS. 5 and 6 illustrate a portion of an air bag module 10c in accordance with a fourth embodiment of the present invention. The air bag module 10c is generally similar to the air bag module 10 (FIGS. 1 and 2) and similar parts are given the same reference numerals with the suffix "c" attached for clarity.

The air bag module 10c includes a tether in the form of an extension portion 130c of the switch 100c. The extension portion 130c is formed as one piece with one of the substrate material layers in the active part of the switch. The material layer, including the extension portion 130c, is made from a strong, flexible material, such as Mylar® brand plastic. The extension portion 130c of the switch 100c extends a substantial distance away from the active portion 131c of the switch. A pair of first fastener openings 132c are formed in the extension portion 130c of the switch 100c. An electrical connector 133c for the switch 100c is located at the outer end of the extension portion 130c of the switch.

When the switch 100c is mounted in the air bag module 10c, the rivets (not shown) extend through the first fastener openings 132c in the extension portion 130c of the switch. The rivets clamp the extension portion 130c of the switch 100c to the base plate (not shown) of the air bag module 10c. Upon inflation of the air bag (not shown) and opening of the cover (also not shown), the tether or extension portion 130c prevents the back plate 110c and the horn switch 100c from moving away from the base plate (not shown) by more than a predetermined amount, i.e., the length of the tether.

From the above description of the invention, those skilled in the art will perceive improvements, changes and modifications. For example, the present invention is not limited to an air bag module which is mounted on a vehicle steering wheel. The present invention can be used with an air bag module mounted on a vehicle instrument panel, a vehicle seat or door panel, or other portion of the vehicle. Such improvements, changes and modifications within the skill of the art are intended to be covered by the appended claims.

Having described the invention, we claim:

1. An apparatus for covering an inflatable vehicle occupant protection device, comprising:

a cover including a portion movable upon inflation of said inflatable device from a closed condition to an open condition;

support means for supporting said inflatable device on a portion of the vehicle;

a membrane switch in an electric circuit for actuating an electrically actuatable device of the vehicle, said membrane switch being movable with said movable portion of said cover from the closed condition to the open condition;

a conductor extending from said membrane switch;

said cover having a portion engageable by the vehicle occupant to operate said membrane switch thereby to actuate the electrically actuatable device;

a rigid back plate for said membrane switch;

means for connecting said back plate with said portion of said cover engageable by the vehicle occupant; and a flexible tether connecting said back plate with said support means to resist movement of said back plate away from said support means beyond a predetermined, said flexible tether spaced apart from said conductor.

2. An apparatus as set forth in claim 1 wherein said switch is adhered to said back plate.

3. An apparatus as set forth in claim 1 wherein said support means comprises a retaining ring of an air bag module which retaining ring is secured to a vehicle steering wheel.

4. An apparatus as set forth in claim 1 wherein said means for connecting said back plate with said portion of said cover engageable by the vehicle occupant comprises a plurality of pins which project from an inner side surface of said portion engageable by the vehicle occupant and which extend through respective retention features in said back plate.

5. An apparatus as set forth in claim 1 wherein one or more first fastener opening is formed in a first end portion of said tether.

6. An apparatus as set forth in claim 1 wherein said tether straightens and extends and blocks movement of said back plate away from said support means beyond a predetermined amount if the force of the inflating inflatable device should disengage said back plate from said cover.

7. An apparatus as set forth in claim 1 wherein said back plate has a rigid, generally planar configuration.

8. An apparatus as set forth in claim 1 wherein said tether is molded to said back plate.

9. An apparatus as set forth in claim 1 wherein said tether comprises an extension portion of a substrate material layer of said switch.

10. An apparatus as set forth in claim 9 wherein said extension portion extends a substantial distance away from an active portion of said switch and includes at least one first fastener opening for connecting said extension portion with said support means.

11. An apparatus as set forth in claim 10 wherein said extension portion of said switch includes means for clamping said extension portion with said cover to said support means.

12. An apparatus for covering an inflatable vehicle occupant protection device, comprising:

a cover including a portion movable upon inflation of said inflatable device from a closed condition to an open condition;

support means for supporting said inflatable device on a portion of the vehicle;

a membrane switch in an electric circuit for actuating an electrically actuatable device of the vehicle, said membrane switch being movable with said movable portion of said cover from the closed condition to the open condition;

said cover having a portion engageable by the vehicle occupant to operate said membrane switch thereby to actuate the electrically actuatable device;

a rigid back plate for said membrane switch;

means for connecting said back plate with said movable portion of said cover; and a flexible tether connecting said back plate with said support means to resist movement of said back plate away from said support means beyond a predetermined amount;

said flexible tether being made from an elongate strap of fabric material.

13. An apparatus for covering an inflatable vehicle occupant protection device, comprising:

a cover including a portion movable upon inflation of said inflatable device from a closed condition to an open condition;

support means for supporting said inflatable device on a portion of the vehicle;

a membrane switch in an electric circuit for actuating an electrically actuatable device of the vehicle, said membrane switch being movable with said movable portion of said cover from the closed condition to the open condition;

said cover having a portion engageable by the vehicle occupant to operate said membrane switch thereby actuate the electrically actuatable device;

a rigid back plate for said membrane switch;

means for connecting said back plate with said movable portion of said cover;

a flexible tether connecting said back plate with said support means to resist movement of said back plate away from said support means beyond a predetermined amount;

one or more first fastener openings being formed in a first end portion of said tether; and a second end portion of said tether being formed into a loop and extends through a slot in said back plate to connect said second end portion of said tether with said back plate.

14. An apparatus as set forth in claim 13 wherein fasteners extend through fastener opening in said inflatable device and through said first fasteners openings in said first end portion of said tether to secure said tether to said support means.

15. An apparatus for covering an inflatable vehicle occupant protection device, comprising:

a cover including a portion movable upon inflation of said inflatable device from a closed condition to an open condition;

support means for supporting said inflatable device on a portion of the vehicle;

a membrane switch in an electric circuit for actuating an electrically actuatable device of the vehicle, said membrane switch being movable with said movable portion of said cover from the closed condition to the open condition;

said cover having a portion engageable by the vehicle occupant to operate said membrane switch thereby to actuate the electrically actuatable device;

a rigid back plate for said membrane switch;

means for connecting said back plate with said movable portion of said cover; and a flexible tether connecting said back plate with said support means to resist movement of said back plate away from said support means beyond a predetermined amount;

said tether being sewn to said back plate.

* * * * *